J. P. SCOVILL.
TOBACCO LEAF STEMMING MACHINE.
APPLICATION FILED MAY 20, 1912.
1,067,148.
Patented July 8, 1913.
2 SHEETS—SHEET 1.
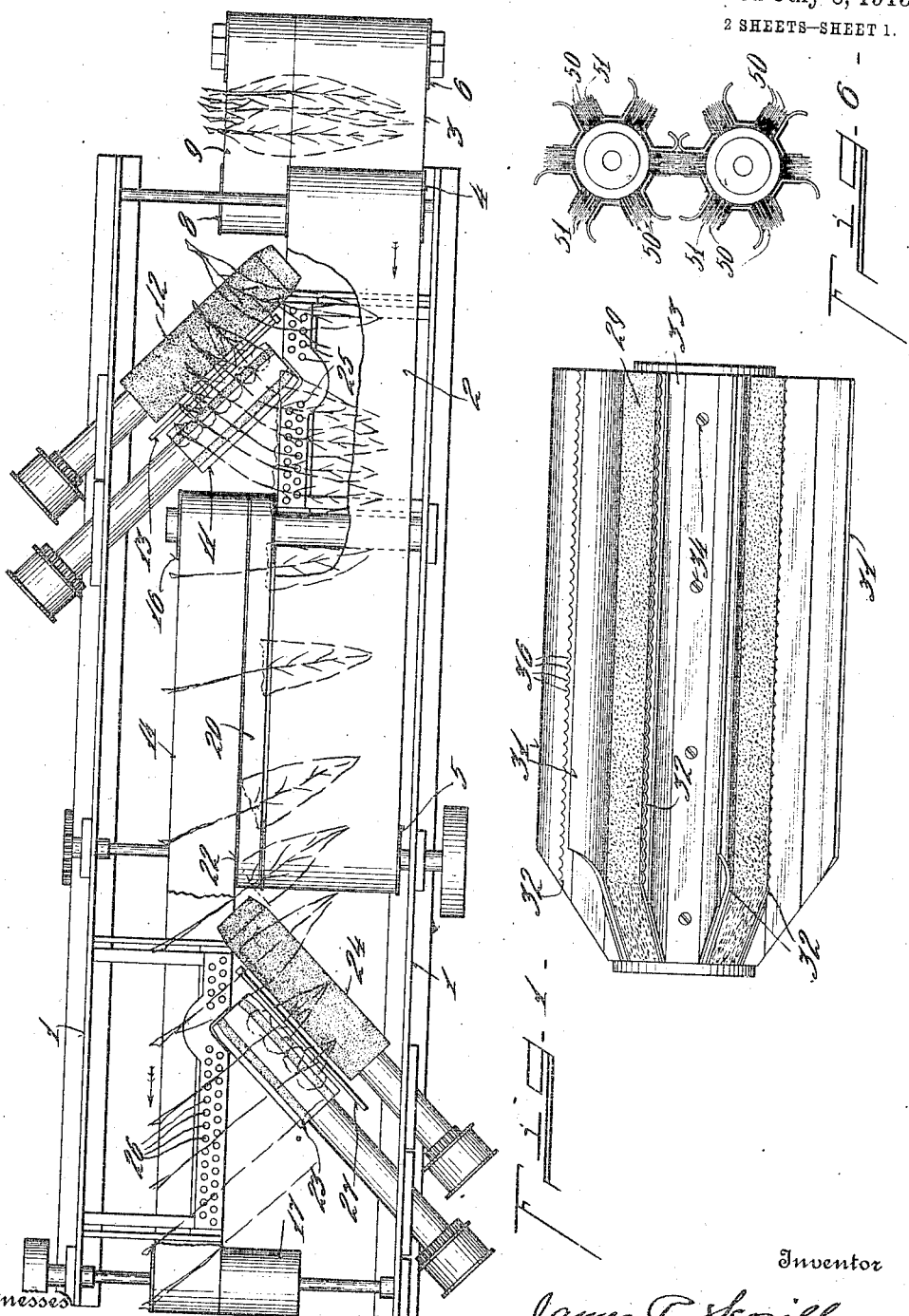
Witnesses
Inventor
James P. Scovill
By
Attorneys

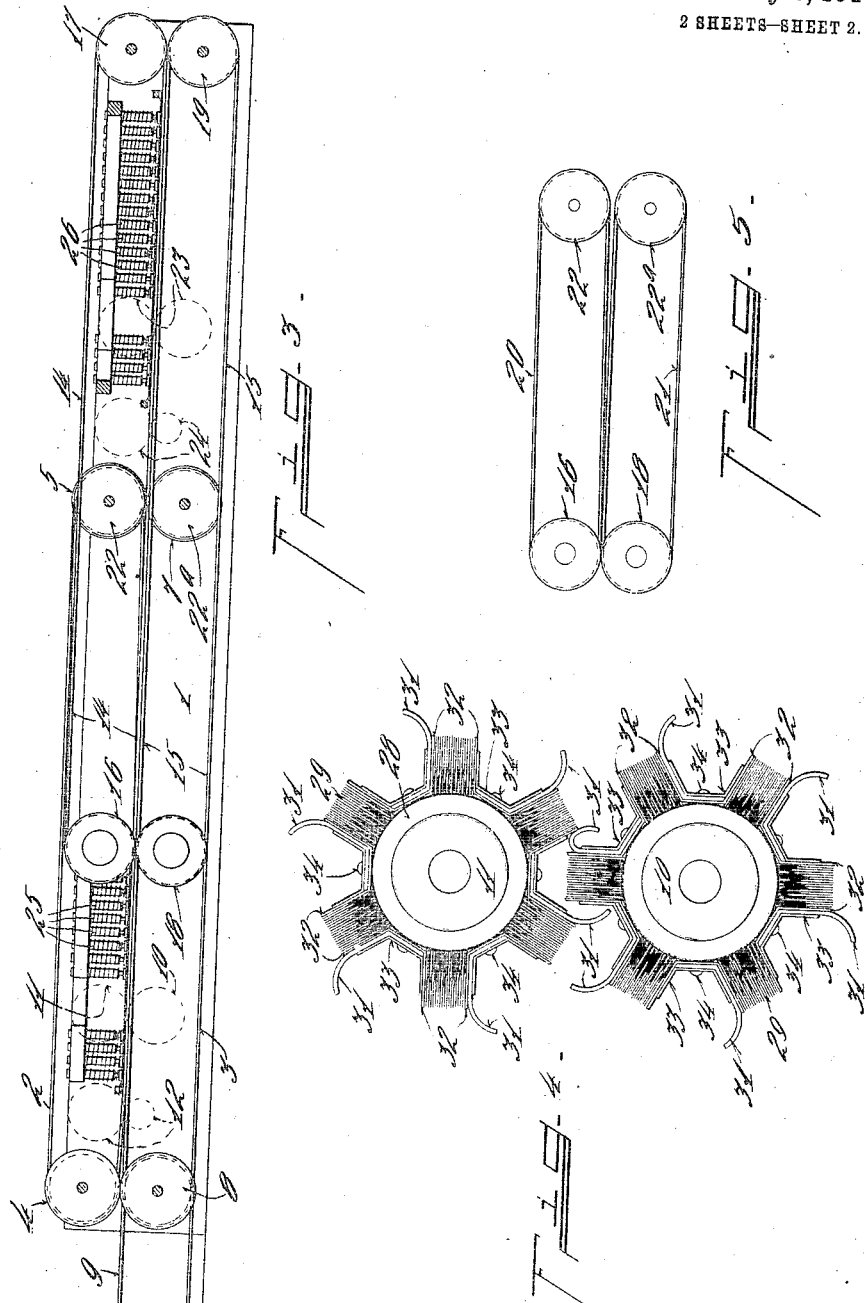

UNITED STATES PATENT OFFICE.

JAMES P. SCOVILL, OF WYOMING, OHIO, ASSIGNOR TO TROJAN MACHINE COMPANY, OF TROY, NEW YORK, A CORPORATION OF NEW YORK.

TOBACCO-LEAF-STEMMING MACHINE.

1,067,148.

Specification of Letters Patent.   Patented July 8, 1913.

Application filed May 20, 1912.   Serial No. 698,456.

*To all whom it may concern:*

Be it known that I, JAMES P. SCOVILL, a citizen of the United States, residing at Wyoming, in the county of Hamilton and State of Ohio, have invented certain new and useful Improvements in Tobacco-Leaf-Stemming Machines, of which the following is a specification.

My invention relates to an improvement in tobacco leaf stemming machines.

This invention is of a subsidiary nature to that forming the subject-matter of a separate application previously filed by me on the 15th day of April, 1912, Serial No. 690,883.

The object of the invention is primarily to simplify the arrangement and organization and improve the efficiency and capacity of a tobacco leaf stemming machine.

I have found from experience that speedier and better results are produced by providing parallel stem gripping carriers, arranged to transpose the order of leaf advancement intermediate the two stripping operations, also the leaf is subjected to no severe mauling influences, and the "droppings" are reduced to a minimum, with a machine embodying the invention herein disclosed and claimed.

The features of this invention will be more fully set forth in the description of the accompanying drawings, forming a part of this specification, in which:—

Figure 1 is a top plan view of the organized machine. Fig. 2 is a side elevation of one of the stripping rolls. Fig. 3 is a side elevation of the stem gripping carrier belt. Fig. 4 is an end elevation showing the setting of the stripping rolls. Fig. 5 is a side elevation of the belt runs and pulleys for the supplemental stem gripping carrier, positioned between the overlapping portions of the first and second stem gripping carriers. Fig. 6 is an end elevation showing a modified setting for the rear stripping rolls.

For the purpose of understanding and disclosing the principles of this present invention, it is not necessary to show or describe the details of the driving and transmission mechanisms for imparting the appropriate motions to the various working members.

1 represents the frame of the machine upon which the working members are mounted as on a table. The first stem gripping carrier comprises upper and lower endless carrier belts 2, 3, respectively, mounted in superposed planes, with the adjacent belt runs adapted to grip the stem or one end of the leaf between them. The upper belt turns on the pulleys 4, 5, and the lower belt on the pulleys 6, 7, the lower belt 3 being projected forwardly of the upper belt 2 to provide a feeder for entering the leaf to the stem grip.

8 is a pulley vertically alined and closely adjacent to pulley 4.

9 is a feeder belt turning on pulleys 6, 8, closely adjacent to and parallel with the projecting end of belt 3. Belts 2, 3, are driven by appropriate mechanism to initially grip and advance the leaves forwardly as shown by the arrow, Fig. 1.

10 and 11 represent a pair of stripping rolls angularly disposed with relation to the forward end of the belts 2, 3, and rotated in a direction in opposition to the leaf pull of said belts, whereby the counter-forces strip the ends of the leaves drawn endwise between said rolls by said initial belts.

12 represents a pair of rejecting rolls located in front of and parallel with the stripping rolls, for throwing out broken leaves or short stems.

13 represents an air-blast downwardly directed between said stripping and rejecting rolls for assisting in the separation and delivery of the severed leaf product initially produced.

The belts 2, 3, extend a little more than half way longitudinally of the machine frame.

14, 15, represent a pair of superposed endless belts constituting the second stem gripping carrier. These belts turn on pulleys 16, 17, and 18, 19, respectively. This second stem gripping carrier commences just in rear of the first stripping rolls 10, 11, and extends clear to the rear end of the machine, the rear end pulleys 17 and 19 being laterally extended to facilitate the final ejectment of the completely stripped stems. It will thus be seen that the first and second stem gripping carriers are parallel in their lines of travel, the second carrier moving also rearwardly, as shown by the arrow in Fig. 1, and being relatively higher speeded than the first carrier, so that the leaf is advanced in a general direction from the front to the rear of the machine under the influence of the primary and secondary stem gripping carriers. Also, the rear end of the first carrier, and the front end of the second carrier have an overlapping relationship between the two stripping operations. These belts are slightly separated at their overlapping portions and between them is placed the supplemental carrier, comprising the superposed endless belts 20, 21, turning on pulleys 16, 22, 18, 18', 22ª, (see Fig. 5), this supplemental carrier being driven in the same direction and at the same rate of speed as the second carrier, comprising belts 14, 15. If desired, the upper belt members may be omitted.

23 represents a second pair of stripping rolls substantially identical in structure and setting as the first stripping rolls 10 and 11. These second stripping rolls are angularly disposed, with relation to the rear end of the second carrier belts 14, 15, and rotating in opposition to the pull thereof, so that the initially gripped portions of the leaves are finally stripped by these second rolls.

24 represents a pair of rejecting rolls similar to rolls 12 and placed correspondingly in front of the second stripping rolls 23.

It will be observed that the first stripping rolls are on the right hand side of the forward end of the first carrier belts 2, 3, and positioned just in front of the forward end of the second carrier belts 14, 15. Just in rear of the first stripping rolls and in front of the second carrier, I preferably place tension means consisting of a series of independent spring-actuated plungers 25, bearing upon the gripping runs of the belts 2, 3, to augment the stem or leaf grip while the leaves are traversing the first stripping zone. It will also be observed that the second stripping rolls 23 are on the left hand side of the second stem gripping carrier belts 14, 15, and positioned in rear of the rear ends of the first stem gripping carrier belts 2, 3, with the angle ends of said rolls in rear of and longitudinally alined with the supplemental carrier belts 20, 21.

In operation, the leaves are laid on the feeder belt 9 and the forward end of belt 3, as shown in Fig. 1, preferably with the tip portions of the leaves lying on belt 3. They are thus fed forward between the pulleys 4 and 8 and gripped between the adjacent runs of belts 2, 3, thus drawing the butt ends of the stems through the first stripping rolls. In this position, the gripped portions of the leaves are traveling in advance of the stripper portions of the stems. It is necessary to gradually turn the stems so that the initially stripped portions will be in a position in advance of the initially gripped portions prior to the second stripping operation, in order to produce the best stripping results and to prevent the stems from becoming broken by the counter-forces of the second stripping. By the organization shown, after the first stripping operation, these trailing initially cleaned stems are caught by the higher speeded second stem gripping carrier belts 14, 15, and the supplemental carrier comprising belts 20, 21. During this overlapping period of travel of the three carriers the stems are gripped with less force than they are when traveling through the stripping zones, where they are influenced by the spring plunger 25 for the first carrier and 26 for the second carrier. This provision permits the stem position to be shifted as shown in Fig. 1, by gradual stages, until the stripped stem portions held by the second carrier are in advance of the corresponding unstripped portions held by the first carrier prior to the second stripping operation, the stems at this point being positioned as indicated in Fig. 1, with the butts in advance of the tips, enabling the second carrier to draw the stems longitudinally through the second stripping rolls, for cleaning the tips initially gripped. The gradual shifting of this position prevents the stems from becoming bent upon themselves, and enables the stems to be properly drawn through the second stripping rolls. Also by the relative speeding of the first and second carriers, the leaves may be rather promiscuously laid on the first feeders, so as to concurrently pass a number of leaves through the first gripping rolls where the stripping is relatively easy, being in a direction counter to the leaf grain. The leaves are then separated slightly by the relative speed influences of the overlapping carriers, so that they do not lie in such close proximity when traveling through the second stripping rolls, which stripping is relatively more difficult as this operation cleans the tip portions of the leaf operating in a direction toward the tip end or with the leaf grain. If desired, a second air blast 27 may be positioned between rolls 23 and 24 for separating the final leaf product. In this way, the initial leaf product is taken away and suitably deposited between the first set of rolls, the broken stuff being separated and deposited in front of rolls 12, while the final leaf product may be separated and delivered between rolls 23, 24, and the final broken or short stuff separated and delivered in front of the rolls 24, of course, the products and discarded stems or broken stuff being all separately collected under the working parts.

I preferably construct the stripping rolls as shown in Figs. 2 and 4, in which:—28 represents the hub of the rolls, 29 represents resilient wires and fibers closely intermixed constituting stripping elements of differential resilience. These elements are secured to the roll and radially project therefrom, forming a segmental series of axially extending stripping members with intervening spaces.

I have indicated a feature in Fig. 6, in which 50 represents elongated wires, or stiff resilient elements, and 51, shorter fiber or relatively soft resilient elements. The stripping elements for each of said series are laterally compacted between the flexible flaps 31, and the binders 32, axially extended across the roll and radially projected therefrom, being held in this position by plates 33 and bolts 34, interposed between the members of the series of strippers. The outer extremities of the flaps 31 project radially beyond the extremities of the resilient stripping element, while the outer edges of the binders 32 terminate substantially flush with the extremities of the resilient stripping elements, and are formed with the serrations 36 to permit the stem passage between the rolls and to subject the leaf to the stripping action upon each side of the stem. Preferably the rolls for stripping counter to the leaf grain are set as shown in Fig. 4 in the intermeshing relationship there indicated, so that the stripping members are alternately presented upon opposite sides of the leaf, as it is drawn between the rolls by the appropriate stem gripping carriers. The operations and results are substantially the same as shown, described and claimed in my said prior application, but for some conditions of operation and products the different organizations here disclosed may be found advantageous.

I have discovered that for some conditions and characters of leaves, of a particularly tough nature, such as some classes of green Burley leaf the operation will be more effectively and efficiently produced if the rolls for stripping counter to the leaf grain or the initial rolls, as shown in the drawings, are set in the intermeshing relationship, shown in Fig. 4, but with the rolls for stripping the tip portion of the leaf lengthwise of the grain or the second stripping rolls, as shown in the drawings, set as shown in Fig. 6, with the stripping members opposed, but sufficiently spaced to permit of the stem passage. The stripping counter to the leaf grain is relatively easy and the intermeshing of the strippers of one roll with the corresponding spaces of the opposing roll, produces satisfactory results. But if the product is particularly tough, a harsher action is desirable for stripping the tip of the leaf in the general direction of the leaf grain and for this character of work I have found that the biting relationship of the opposing strippers, shown in Fig. 6, produces the increased aggressive stripping action adequate to clean the toughest leaves in the direction toward the stem tips. The rolls of a given machine may at any time be readily reset to meet this requirement whenever occasion arises from the physical characteristics of the particular stock on hand.

With this, as well as the machine of my prior application, Serial No. 690,883, it is obvious, that the arrangement might be transposed, to reverse the order of stripping. That is, the butts might be initially gripped and the tips initially stripped lengthwise of the leaf grain. The first stripping rolls, however, have to break into an intermediate portion of the leaf, and strip from that point toward the ungripped portion of the stem, so that preferably I grip the tips first, as the breaking into the leaf by the stripping elements and the attendant stripping from that point, are rendered much easier, and the results are more perfect, if the elements at the time of breaking in are operating in a direction counter to the leaf grain.

The projecting wires, shown in Fig. 6, greatly increase the aggressive character of the stripping. If the elements of different resilience terminate substantially flush the aggressive character of the stripping would be modified, while if the fibers are made the projecting elements, and the wires terminate below the fibers, the aggressive character of the stripping would be correspondingly softened. Thus the relative aggressive stripping action may be predetermined with reference to the physical characteristics of stock, in which there is great variation.

Having described my invention, I claim:—

1. In a tobacco stemming machine, an initial stem gripping carrier, stripping instrumentalities cooperating therewith, a second stem gripping carrier adapted to catch the initially stripped stems, second stripping instrumentalities cooperating with said second carrier, said carriers having an overlapping relationship beyond the first stripping instrumentalities and operating in the same general direction of travel, the arrangement of the carriers being such that the initially gripped leaf portion travels in advance of the ungripped portion for the first operation, and means whereby the second carrier engages the initially stripped stems and gradually shifts them to a position in advance of the leaf portions held by the first carrier prior to the second stripping.

2. In a tobacco leaf stemming machine, an initial stem gripping carrier, stripping instrumentalities cooperating therewith, a second stem gripping carrier, second stripping instrumentalities cooperating therewith, the rear end of the first carrier having an overlapping relationship with the front end of the second carrier, said carriers having the same general direction of travel, said two sets of carriers being differentially speeded rendering a transposition of the order of leaf advancement intermediate the two stripping operations.

3. In a tobacco leaf stemming machine, an initial stem gripping carrier, stripping instrumentalities coöperating therewith, a second stem gripping carrier, second stripping instrumentalities coöperating therewith, the rear end of the first carrier having an overlapping relationship with the front end of the second carrier, said carriers having the same general direction of travel, the said carrier being relatively higher speeded, and means causing the stem position to be shifted when held by the overlapping portions of said carriers.

4. In a tobacco leaf stemming machine, an initial stem gripping carrier, stripping instrumentalities coöperating therewith, a second stem gripping carrier, second stripping instrumentalities coöperating therewith, the rear end of the first carrier having an overlapping relationship with the front end of the second carrier and operating in parallel lines with the second carrier relatively higher speeded, and means shifting the stem position when held by the overlapping portion of said carriers, whereby these stripped portions of the stem are traveling in advance of the leaf portions held by the first carrier at the time of the second stripping.

5. In a tobacco leaf stemming machine, an initial stem gripping carrier, stripping instrumentalities coöperating therewith, a second stem gripping carrier, the rear end of the first carrier having an overlapping relationship with the front end of the second carrier and operating in parallel lines with the second carrier relatively higher speeded, means shifting the stem position when held by the overlapping portions of said carriers, and second stripping instrumentalities located beyond the rear end of the first carrier and coöperating with the second carrier, whereby in each operation the gripped portions are in advance for each stripping operation, enabling the stems to be drawn substantially lengthwise through the strippers in each of said operations.

6. In a tobacco leaf stemming machine, an initial and secondary stem gripping carrier, the rear and front ends of which respectively overlap in parallel lines, two sets of angularly disposed stripping rolls coöperating with the front and rear ends of said first and second carrier respectively, and means causing the stems caught by the second carrier to be shifted to a position in advance of the portions held by the first carrier while the product is under the influence of both carriers.

7. In a tobacco leaf stemming machine, an initial stem gripping carrier comprising a pair of endless superposed belts, a second stem gripping carrier also comprising a pair of superposed endless belts, the rear and front ends of said belts respectively overlapping in adjacent parallel lines, means driving the second belts at a predetermined relatively higher speed than the first belts transposing the order of leaf advancement, means gradually relaxing the grip of the first belts during the leaf travel through the overlapping carrier positions, a pair of angularly disposed stripping rolls coöperating with the first carrier and positioned in front of the second carrier, and a second pair of angularly disposed stripping rolls coöperating with the second carrier and positioned in rear of the first carrier.

8. In a tobacco leaf stemming machine, an initial stem gripping carrier comprising a pair of endless superposed belts, a second stem gripping carrier also comprising a pair of endless superposed belts, the rear and front ends of said belts respectively overlapping in parallel lines, the second carrier being relatively higher speeded transposing the order of leaf advancement, a pair of angularly disposed stripping rolls coöperating with the first carrier positioned in front of the second carrier, a second pair of angularly disposed stripping rolls coöperating with the second carrier and positioned in rear of the first carrier, and tension means for augmenting the stem grip of said belts in rear of each pair of stripping rolls respectively and coöperating with the non-overlapping portions of said belts respectively.

9. In a tobacco leaf stemming machine, an initial stem gripping carrier comprising a pair of endless superposed belts, a second stem gripping carrier also comprising a pair of superposed endless belts, the rear and front ends of said belts respectively overlapping in parallel lines, a supplemental carrier positioned intermediate the overlapping portions of said first and second carrier, the said second and supplemental carriers being relatively higher speeded than the first carrier, means shifting the stem positions when held by the overlapping portions of said carriers, a pair of angularly disposed stripping rolls coöperating with the first carrier and positioned in front of the second carrier, and a second pair of angularly disposed stripping rolls coöperating with the second carrier and positioned in rear of the first carrier and the supplemental carrier, with the angle end of said second rolls in rear of and adjacent to the terminal end of said supplemental carrier.

10. In a tobacco leaf stemming machine, a roll, resilient stripping elements secured and radially projecting from said roll in segmental series, and binders laterally compacting the resilient stripping elements of each series, said binders extending axially across the roll and radially projecting therefrom substantially flush with the extremities of the resilient stripping elements, the outer edges of said binders being serrated.

11. In a tobacco leaf stemming machine, a roll, resilient stripping elements secured and radially projecting from said roll in segmental series, binders laterally contacting one side of the resilient stripping elements of each series, said binders extending axially across the roll and radially projecting therefrom substantially flush with the extremities of the resilient stripping elements, the outer edges of said binders being serrated, and flexible flaps secured to the roll and held against the opposite sides of said resilient stripping elements, said elements being laterally compacted between said binders and flaps, the outer portions of said flaps projecting radially beyond the extremities of the stripping elements.

12. In a tobacco leaf stemming machine, two stem gripping carriers operating in parallel lines, stripping rolls in front of the second carrier and cooperating with the first carrier, stripping rolls in rear of the first carrier and cooperating with the second carrier, and short product repelling rolls located in front of the first stripping rolls having radially projected flexible repelling members operating to discard broken leaves so that they will not enter the first stripping rolls.

13. In a tobacco leaf stemming machine, a first and second stem gripping carrier, stripping rolls independently operating with said carriers respectively, said rolls being formed with segmental series of resilient stripping elements, one pair of rolls being set with the stripping members and intervening spaces respectively intermeshed, and the other pair of rolls being set with their stripping members respectively opposed to one another.

14. In a tobacco leaf stemming machine, a first and a second stem gripping carrier, a first and a second pair of stripping rolls angularly disposed with relation to and cooperating respectively with said first and second carriers, said rolls being formed with segmental resilient stripping elements, said rolls having non-stripping peripheral surfaces rendering an intermitting action, the first rolls being set with the stripping members and intervening spaces arranged for stripping counter to the leaf grain and the second pair of rolls being set with the stripping members and intermediate non-stripping surfaces respectively arranged for stripping lengthwise of the leaf grain.

15. In a tobacco leaf stemming machine, a roll having resilient wire and fiber stripping elements, closely compacted and radially projected from said roll, the extremities of the wires projecting outwardly beyond the extremities of the fibers.

16. In a tobacco leaf stemming machine, a roll having relatively stiff and weak resilient stripping elements, the stiffer resilient elements projecting radially beyond the extremities of the softer resilient elements.

17. In a tobacco leaf stemming machine, two sets of stem gripping carriers and angularly disposed rolls arranged for sequential and coordinate operation from a medial portion of the web stripping toward the tip in one instance and toward the butt in the other instance, said sequential carriers having the same general direction of travel with overlapping ends intermediate the two stripping operations, said carriers being arranged to cooperate when the products are concurrently held by the two carriers for transposing the order of leaf advancement, the rolls having stripping instrumentalities of differential efficiency and having intermediate non-stripping surfaces, and a flexible member secured to the non-stripping surface of one of the rolls with its loose portion operative in relation to the extremities of the strippers for clearing the same of the product under the influence of centrifugal force imparted by the rotation of the rolls.

18. In a tobacco leaf stemming machine, two sets of stem gripping carriers and angularly disposed rolls arranged for sequential and coordinate operation from a medial portion of the web stripping toward the tip in one instance and toward the butt in the other instance, said sequential carriers having the same general direction of travel with overlapping ends intermediate the two stripping operations, said carriers being arranged to cooperate when the products are concurrently held by the two carriers for transposing the order of leaf advancement, the rolls having stripping instrumentalities of differential efficiency and having intermediate non-stripping surfaces, providing leaf access between the ends of the rolls and limiting the depth of stem embedment into the stripping surfaces, and a flexible member secured to the non-stripping surface of one of the rolls with its loose portion operative in relation to the extremities of the strippers for clearing the same of the product under the influence of centrifugal force imparted by the rotation of the rolls.

19. In a tobacco stemming machine, a pair of stripping rolls having stripping elements of differential efficiency set to simultaneously act upon a leaf tangentially passing between the rolls, said rolls having non-stripping and non-contacting peripheral surfaces intermediate the stripping segments rendering an intermittent stripping operation, the rolls being highly speeded for a high frequency stripping operation, the oppositely set non-stripping and non-contacting peripheral surfaces maintaining an opening between the rolls during a considerable portion of a single rotation for ready access of the leaf between the ends of the rolls, and enabling the trailed portion of a leaf to readily move progressively endwise of the rolls lengthwise of and parallel with the stem.

20. In a tobacco stemming machine, two sets of stem gripping carriers arranged substantially parallel with overlapping ends providing a common stem gripping zone, stripping instrumentalities coöperating with the non-overlapping portions of said gripping carriers providing sequential stripping operations, tension and grip determining means, arranged to initially lightly grip and then tighten the stem grip of the first carrier for the first stripping operation, easing the initial grip after the first stripping operation, the second carrier first lightly gripping and then tightening the stem grip concurrently with the easing of the stem grip of the first carrier, for shifting the stem and drawing it to the action of the second strippers under augmented tension of the second carrier.

In testimony whereof, I have hereunto set my hand.

JAMES P. SCOVILL.

Witnesses:
OLIVER B. KAISER,
CLARENCE B. FOSTER.